US009469178B2

(12) United States Patent
Lee

(10) Patent No.: US 9,469,178 B2
(45) Date of Patent: Oct. 18, 2016

(54) ROLLER BLIND CURTAIN DEVICE FOR CAR

(71) Applicant: Hyundai Motor Company, Seoul (KR)

(72) Inventor: Seong Muk Lee, Yongin-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 3 days.

(21) Appl. No.: 14/570,478

(22) Filed: Dec. 15, 2014

(65) Prior Publication Data

US 2016/0096417 A1    Apr. 7, 2016

(30) Foreign Application Priority Data

Oct. 2, 2014   (KR) .................. 10-2014-0132836

(51) Int. Cl.
*B60J 3/00*    (2006.01)
*B60J 1/20*    (2006.01)

(52) U.S. Cl.
CPC .............. *B60J 1/203* (2013.01); *B60J 1/2063* (2013.01); *B60J 1/2086* (2013.01)

(58) Field of Classification Search
CPC ...... B60J 1/203; B60J 1/2063; B60J 1/2047; E06B 9/66; E06B 2009/804; E06B 9/90; E06B 9/80
See application file for complete search history.

(56) References Cited

U.S. PATENT DOCUMENTS

| | | | | | |
|---|---|---|---|---|---|
| 1,568,379 A | * | 1/1926 | Hartley | ..................... | E06B 9/82 160/299 |
| 3,819,217 A | * | 6/1974 | Savino | ..................... | E06B 9/86 160/133 |
| 4,368,771 A | * | 1/1983 | Hopper | ..................... | E06B 9/17 160/121.1 |
| 4,492,261 A | * | 1/1985 | Chong | ..................... | E06B 9/78 160/319 |
| 5,226,467 A | * | 7/1993 | Lii | ..................... | B60J 1/2033 160/302 |
| 5,275,222 A | * | 1/1994 | Jelic | ..................... | E06B 9/324 160/178.2 |
| 7,128,126 B2 | * | 10/2006 | Smith | ..................... | E06B 9/262 160/121.1 |
| 7,717,154 B2 | * | 5/2010 | Cheng | ..................... | E06B 9/322 160/170 |
| 7,775,254 B2 | * | 8/2010 | Judkins | ..................... | E06B 9/324 160/178.2 |
| 9,194,177 B2 | * | 11/2015 | Anthony | ..................... | E06B 9/262 |
| 2005/0028943 A1 | * | 2/2005 | Chang | ..................... | E06B 9/42 160/23.1 |
| 2009/0020236 A1 | * | 1/2009 | Hansen | ..................... | B60J 1/2033 160/275 |
| 2014/0262066 A1 | * | 9/2014 | Certain | ..................... | E06B 9/26 160/84.02 |

FOREIGN PATENT DOCUMENTS

| | | |
|---|---|---|
| JP | 8-58367 A | 3/1996 |
| JP | 2004-314841 A | 11/2004 |
| JP | 2008-195267 A | 8/2008 |

(Continued)

*Primary Examiner* — Katherine Mitchell
*Assistant Examiner* — Abe Massad
(74) *Attorney, Agent, or Firm* — Morgan, Lewis & Bockius LLP

(57) ABSTRACT

A roller blind curtain device for a car may include a roller blind provided between a door-side door trim and an inner panel of the car, and having a wrapping roll winding and wrapping a curtain fabric that may be drawn out to a top in a longitudinal direction of a window to block sunlight that comes in through the window, a curtain holding device positioned adjacent to the wrapping roll of the roller blind and holding the curtain fabric drawn out from the wrapping roll along the window to stop at a predetermined position, and a support frame positioned at an outlet side of the roller blind, having a first end connected to a draw-out bar formed at an end of the curtain fabric, and extended as long as a length of the curtain fabric drawn out from the roller blind to support the curtain fabric.

5 Claims, 5 Drawing Sheets

(56) References Cited

FOREIGN PATENT DOCUMENTS

| KR | 20-0427548 Y1 | 9/2006 |
| KR | 10-2008-0023829 A | 3/2008 |
| KR | 10-2008-0082927 A | 9/2008 |
| KR | 10-2009-0009749 A | 1/2009 |
| KR | 10-2009-0031246 A | 3/2009 |
| KR | 10-2011-0100561 A | 9/2011 |
| KR | 10-2013-0034811 A | 4/2013 |
| KR | 20-2013-0004787 U | 8/2013 |

* cited by examiner

ROLLER BLIND CURTAIN DEVICE FOR CAR

CROSS-REFERENCE TO RELATED APPLICATION

The present application claims priority to Korean Patent Application No. 10-2014-0132836 filed on Oct. 2, 2014, the entire contents of which is incorporated herein for all purposes by this reference.

BACKGROUND OF THE INVENTION

1. Field of the Invention

The present disclosure relates to a roller blind curtain device for a car that stops a curtain of a roller blind at a position desired by an occupant to secure visibility and an exposure amount which are desired by the occupant.

2. Description of Related Art

In general, window glass for a car is used for securing side visibility and a fresh interior at the time of driving a car, but in the case where there are a lot of sunshine amounts, such as a summer season, since plenty of direct sunlight is transmitted through the glass, a temperature in a car interior increases and dazzling of a driver, and the like are caused, and as a result, safe driving is often disturbed.

Therefore, when a user desires to cover the window glass with a curtain device such as a roller blind installed between a door trim and a door inner panel of a vehicle, the user covers the window glass by drawing out the curtain device upward to block sunlight anytime.

As described above, the roller blind includes a manual type constituted by a wrapping roll on which an awning screen is wrapped and a handle bar that allows the awning screen to manually move and an electric motor type constituted by a handle shaft configured to wrap one end of the awning screen and open and close the awning screen by forward and backward movement in order to serve as the wrapping roll and the handle bar.

That is, when the wrapping roll and the handle bar are separately provided, one side of the awning screen is wrapped on the outer circumferential surface of a shaft and the other side of the awning screen is connected to the handle bar to be rolled or unrolled by forward rotation or reverse rotation of the shaft, which occurs by drawing out the handle bar to drive the roller blind and when the handle shaft is provided, one side of the awning screen is fixedly installed in a vehicle body, and the like and the other side of the awning screen is wrapped on the outer circumferential surface of the handle shaft, and as a result, while the awning screen wrapped on the handle shaft is unrolled or rolled by drawing out the handle shaft, the roller blind is driven.

In this case, rollers are connected to both ends of the wrapping roll or the handle shaft and wires for transferring drive force of the roller blind are wrapped on the rollers, respectively and since the handle bar is simply fixed to the top of the door to install a curtain, and as a result, the height of the curtain drawn out for securing visibility and controlling a sunshine amount cannot be arbitrarily controlled as necessary.

In order to solve the resulting problem, Korean Patent Application Publication No. 10-2009-0009749 (Shading Roller Blind with Roller Blind Lock) is proposed and in the related art, the awning screen rolled on the roller blind moves up and down by vertically driving and operating a rod connected with a pull profile through a mechanical driving means provided inside a door inner panel to arbitrarily control a height, thereby controlling a radiation amount of the sunlight.

However, the roller blind device in the related art occupies a significant volume and has a complex structure, and as a result, manufacturing cost is increased due to the configuration.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a roller blind curtain device for a car that is configured such that a holding operation of a holding roller formed in a holding means is released by pulling a wire connected with the curtain holding means elastically provided in a roller blind provided in a window of the car to hold a curtain fabric drawn out from the roller blind through a pivoting operation of a curtain knob formed in a draw-out bar to arbitrarily adjust a draw-out height of the curtain fabric through the holding operation of the curtain holding means, and as a result, can arbitrarily change visibility and an exposure amount desired by an occupant and save manufacturing cost.

In one aspect, the present disclosure provides a roller blind curtain device for a car, including a roller blind provided between a door-side door trim and an inner panel of the car, and having a wrapping roll winding and wrapping a curtain fabric that is drawn out to the top in the longitudinal direction of a window to block sunlight that comes in through the window, a curtain holding means positioned adjacent to the wrapping roll of the roller blind and holding the curtain fabric drawn out from the wrapping roll along the window to stop at a predetermined position, and a support frame positioned at an outlet side of the roller blind, having one end connected to a draw-out bar formed at the end of the curtain fabric, and extended as long as a length of the curtain fabric drawn out from the roller blind to support the curtain fabric.

In a preferred embodiment, the curtain holding means may include a stop rod extended horizontally inside the curtain frame, a holding roller provided at the end of the stop rod, reciprocating along a long-hole formed in the stop rod, and catching and holding one surface of the curtain fabric, a spring wound on the stop rod to elastically operate so as for the holding roller to continuously keep the curtain fabric in a holding state, and a wire releasing a holding operation of the holding roller by a pivoting operation of the curtain knob provided in the draw-out bar.

According to a preferred embodiment of the present disclosure, since a draw-out height of a curtain fabric can be arbitrarily adjusted by a holding operation of a curtain holding means, visibility and an exposure amount desired by an occupant can be arbitrarily changed and manufacturing cost can be saved.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

Figure 1:
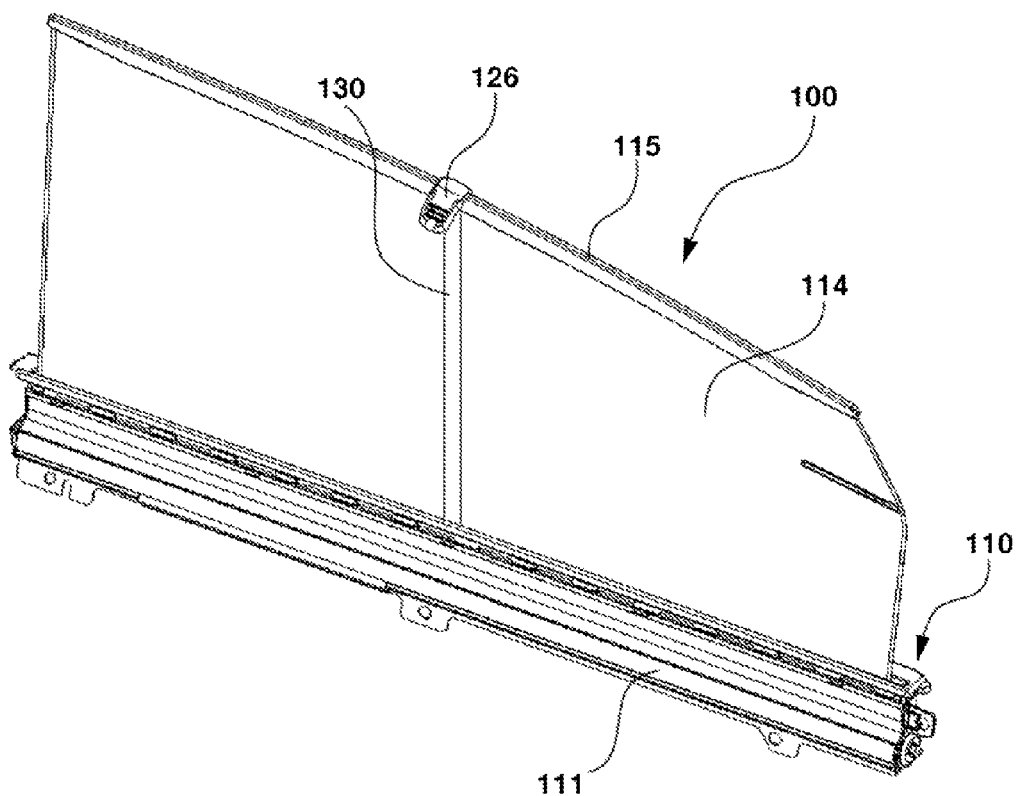
FIG. 1 is a configuration diagram of a roller blind curtain device for a car according to the present disclosure.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter reference will now be made in detail to various embodiments of the present invention, examples of which are illustrated in the accompanying drawings and described below.

A roller blind curtain device 100 for a car according to the present disclosure includes a roller blind 110 provided between a door-side door trim and an inner panel of the car and having a wrapping roll 112 winding and wrapping a curtain fabric 114 that is drawn out to the top in the longitudinal direction of a window and blocking sunlight that comes in through the window, as illustrated in FIGS. 1 to 5.

Herein, the roller blind 110 is preferably configured to be installed horizontally along the door trim and the curtain fabric 114 is drawn out to the top from the wrapping roll 112 to cover the window of the door.

Meanwhile, a curtain holding device 120 positioned adjacent to the wrapping roll 112 and holding the curtain fabric 114 drawn out from the wrapping roll 112 along the window so as to stop at a predetermined position is included in a curtain frame 111 of the roller blind 110.

The curtain holding device 120 is configured to press one surface of the curtain fabric 114 drawn out to the top from the wrapping roll 112 along a curtain outlet 116 of the curtain frame 111 and closely contact the pressed surface onto the inner surface of the curtain frame 111 to fix the curtain fabric 114 while the curtain fabric 114 is pulled to a predetermined position.

A support frame 130 is included in the curtain outlet 116 of the curtain frame 111, which has one end of the support frame 130 connected to a draw-out bar 115 formed at the end of the curtain fabric 114 and is extended as long as a length by which the curtain fabric 114 is drawn out from the roller blind 110 to support the curtain fabric 114.

Herein, the support frame 130 continuously supports the draw-out bar 115 to keep the curtain fabric 114 to being stretched even though the curtain fabric 114 is drawn out to a predetermined height while the curtain fabric 114 is drawn out from the roller blind 110.

Figure 2:
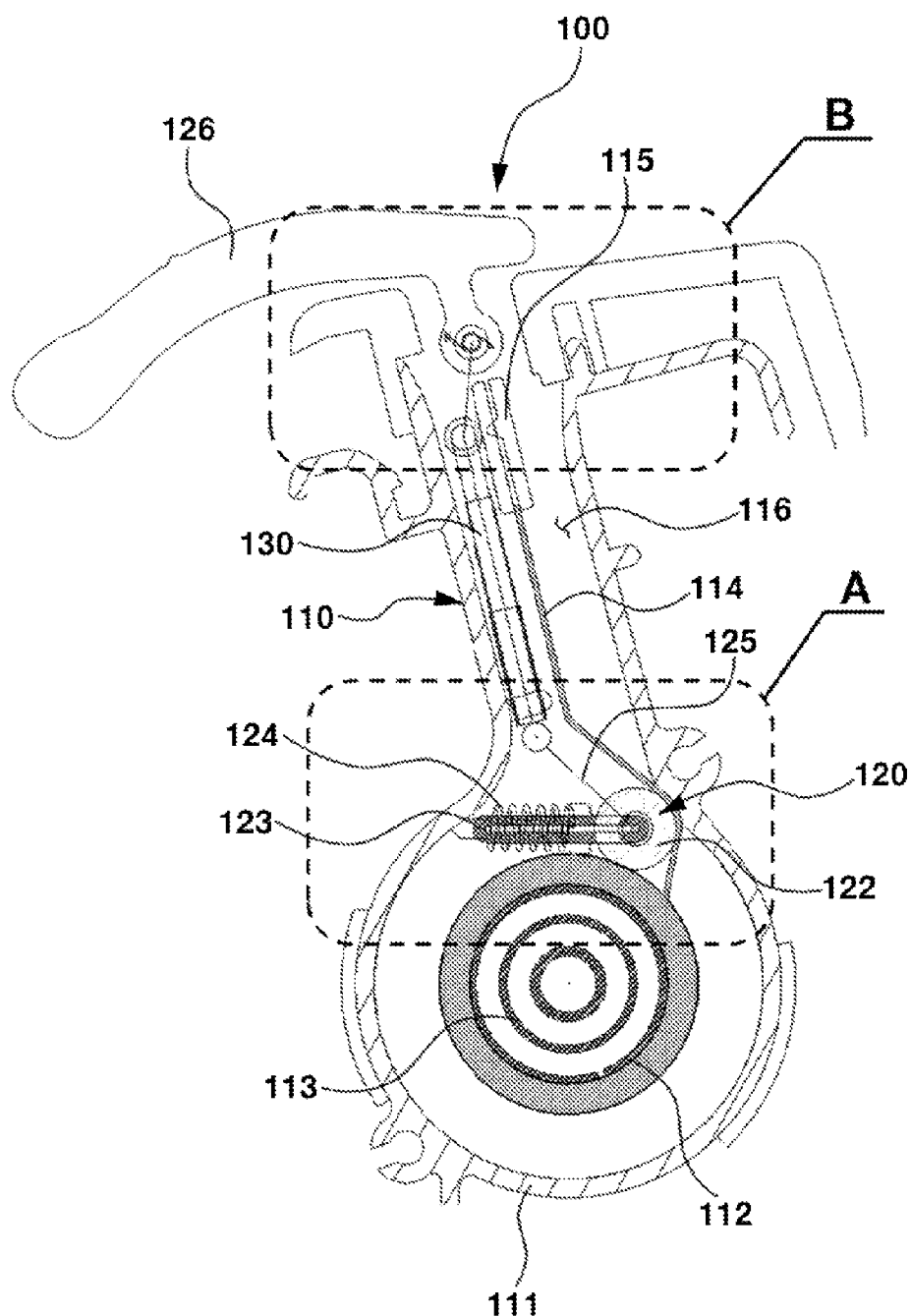
FIG. 2 is a cross-sectional configuration diagram of the roller blind curtain device for a car according to the present disclosure.

According to the configuration, as illustrated in FIG. 2, the roller blind 110 accommodates the wrapping roll 112 and has the curtain frame 111 having the curtain outlet 116 through which the curtain fabric 114 is drawn out, which is formed at one side thereof.

The curtain frame 111 is installed horizontally in a tubular shape and one portion of the top of the circumference protrudes and is opened to form the curtain outlet 116.

The curtain frame 111 includes a wrapping spring 113 that is provided inside the wrapping roll 112 and elastically operates so that the curtain fabric 114 continuously pivots to be wound on the wrapping roll 112.

In this case, the wrapping spring 113 is preferably installed in the wrapping roll 112 in a spiral spring scheme so as to continuously rotate the wrapping roll 112 unidirectionally.

Herein, the curtain fabric 114 is provided, which is wound on the outer surface of the wrapping roll 112 and drawn out by pulling the draw-out bar 115 connected to the end through the curtain outlet 116 of the curtain frame 111 to cover the door-side window of the car and block the sunlight, and the curtain fabric 114 may selectively configure any one of a net body or a mesh fabric according to performance to block the sunlight.

The draw-bar 115 is installed, which is formed at the end of the curtain fabric 114 to allow the curtain fabric 114 to be stretched to correspond to the window and a curtain knob 126 which operates the curtain holding device 120 is preferably installed at the center of the draw-out bar 115 to be vertically pivotable.

Figure 3:
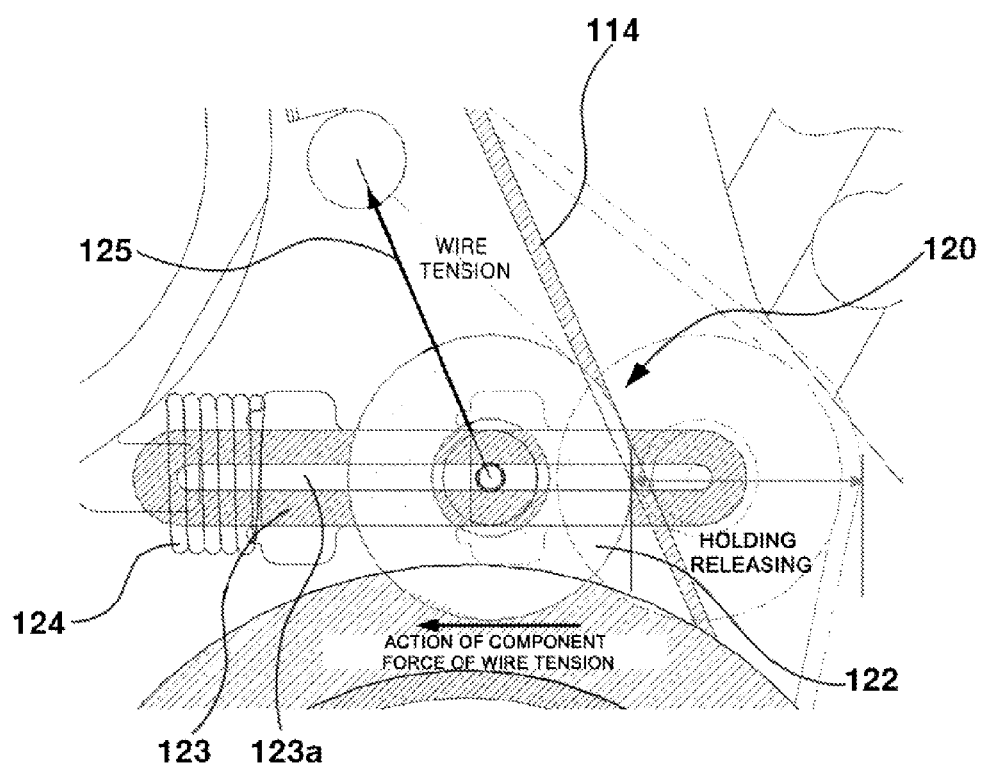
FIG. 3 is an enlarged configuration and operation state diagram of part A of FIG. 2.

Meanwhile, the curtain holding device 120 includes a stop rod 123 extended horizontally inside the curtain frame 111 and having a long-hole shaped guide hole 123a formed in the longitudinal direction thereof, as illustrated in FIG. 3.

A holding roller 122 that holds the curtain fabric 114 by closely contacting the curtain fabric 114 onto the inner surface of the curtain frame 111 with elastic force of a holding spring 124 wound on the stop rod 123 is provided at the end of the stop rod 123.

In this case, the holding roller 122 may be transferred along the guide hole 123a formed at the stop rod 123, and is pulled to the holding spring 124 by the pulling operation of the connected wire 125 to be released from the close contact to the curtain fabric 114, and as a result, the curtain fabric 114 may be arbitrarily drawn out.

The holding spring 124 wound on the stop rod 123 closely contacts the holding roller 122 to the curtain fabric 114 so that the holding roller 122 continuously keeps the curtain fabric 114 in a holding state until the holding roller 122 is pulled by the wire 125.

Figure 4:
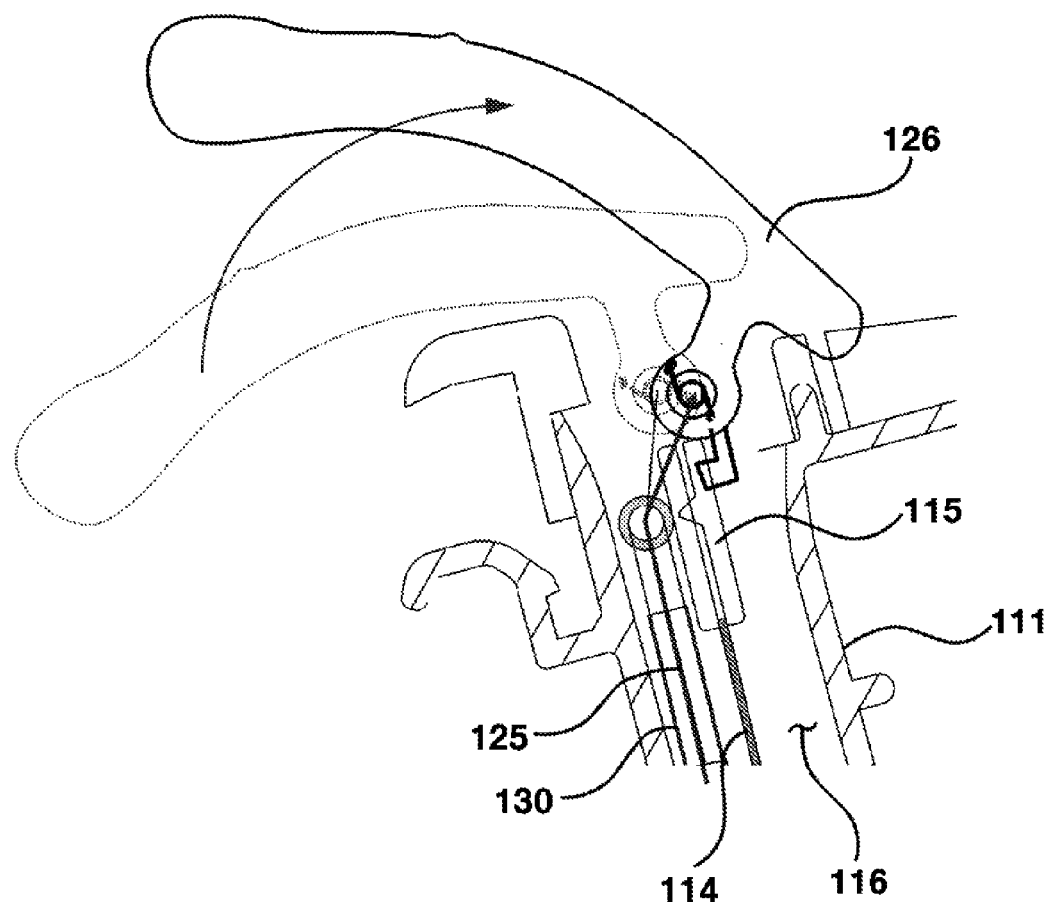
FIG. 4 is an enlarged configuration and operation state diagram of part B of FIG. 2.

Meanwhile, referring to FIG. 4, the wire 125 is provided, which releases the holding operation of the holding roller 122 by the pivoting operation of the curtain knob 126 provided in the draw-out bar 115 and both ends of the wire 125 are connected to the curtain knob 126 and the holding roller 122, respectively.

The wire 125 is provided to penetrate in the longitudinal direction of the support frame 130, and one end of the wire 125 is connected to the curtain knob 126 and the other end of the wire 125 is connected to the holding roller 122, as illustrated in FIGS. 3 and 4.

Herein, as the curtain knob 126 pivots vertically, the holding roller 122 is transferred in the longitudinal direction of the stop rod 123 by the pulling operation of the wire 125 to release the holding operation and easily draw out the curtain fabric 114.

Figure 5:
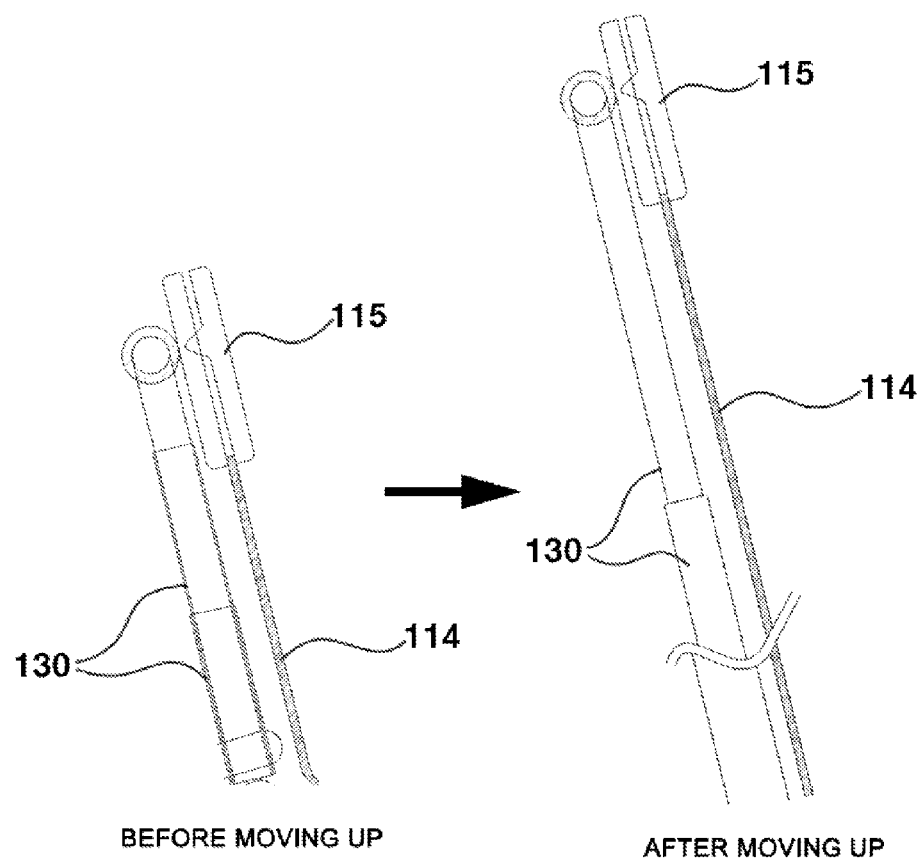
FIG. 5 is an operation state diagram of an antenna in the roller blind curtain device for a car according to the present disclosure.

Meanwhile, referring to FIG. 5, the support frame 130 preferably has a bar shape in which a plurality of rods are drawn out in a telescope scheme so as to extend along the draw-out bar 115 to correspond to a draw-out length of the curtain fabric 114.

The wire 125 is preferably wound on the holding roller 122 as long as the extension length of the support frame 130 so as to extend as long as the extension length of the support frame 130.

As described above, detailed effects and operations in the configured present disclosure will be described in detail with reference to the accompanying drawings.

Referring to FIG. 2, when the curtain fabric 114 is drawn out from the wrapping roll 112 provided in the roller blind 110, the curtain knob 126 provided in the draw-out bar 115 pivots upward to pull the wire 125 connected to one side of the curtain knob 126.

In this case, referring to FIGS. 3 and 4, the wire 125 minutely pulls the holding roller 122 connected to the other end along the support frame 130 in the longitudinal direction of the stop rod 123.

As a result, as the curtain fabric 114 disengages from the holding roller 122, the occupant draws out the curtain fabric 114 connected from the roller blind 110 by pulling the draw-out bar 115 to arbitrarily set the height of the curtain fabric 114 to a height desired by the occupant.

In this case, the support frame 130 extends upward along the draw-out bar 115 to support the curtain fabric 114, as illustrated in FIG. 5.

Next, when the curtain knob 126 pivots downward, pulling force of the connected wire 125 is released, and as a result, the holding roller 122 closely contacts the curtain fabric 114 onto the inner surface of the curtain frame 111 to hold the curtain fabric 114 by elastic force of the holding spring 124 provided in the stop rod 123.

Accordingly, the occupant operates the curtain device 100 according to the order to secure the visibility and control a radiation amount of the sunlight by adjusting the height of the curtain fabric 114 to the height desired by the occupant.

As a result, the present disclosure configured as above is provided, and as a result, the draw-out height of the curtain fabric can be arbitrarily adjusted through the holding operation of the curtain holding means, so that the visibility and an exposure amount desired by the occupant can be arbitrarily changed and manufacturing cost can be saved.

Terms and words used in the present specification and claims should not be interpreted as being limited to typical or dictionary meanings, but should be interpreted as having meanings and concepts which comply with the technical spirit of the present invention, based on the principle that an inventor can appropriately define the concept of the term to describe his/her own invention in the best manner.

Therefore, configurations illustrated in the drawings and the exemplary embodiments described in the present specification are only the most exemplary embodiment of the present invention and do not represent all of the technical spirit of the present invention, and thus it is to be understood that various equivalents and modified examples, which may replace the configurations, are possible when filing the present application.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A roller blind curtain device for a car, comprising:
   a roller blind provided between a door-side door trim and an inner panel of the car, the roller blind having a curtain frame and a wrapping roll disposed in the curtain frame and winding and wrapping a curtain fabric drawn out to a top of a door-side window in a longitudinal direction of the door-side window to block sunlight that comes in through the window;
   a curtain holding device positioned adjacent to the wrapping roll of the roller blind and selectively holding the curtain fabric drawn out from the wrapping roll along the window to stop at a predetermined position; and
   a support frame positioned at an outlet side of the roller blind, having a first end connected to a draw-out bar formed at an end of the curtain fabric, wherein the support frame is extendable to be as long as a length of the curtain fabric drawn out from the roller blind to support the curtain fabric,
   wherein the curtain holding device includes:
   a stop rod oriented horizontally inside the curtain frame and including an elongated hole along a longitudinal direction of the stop rod;

a holding roller slidably engaged in the elongated hole of the stop rod, reciprocating along the hole formed in the stop rod, and catching and holding one surface of the curtain fabric; and a wire releasing a holding operation of the holding roller by a pivoting operation of a curtain knob provided in the draw-out bar, wherein a first end of the wire is connected to the curtain knob and a second end of the wire is connected to the holding roller.

2. The device of claim 1, wherein the roller blind includes:

the curtain frame accommodating the wrapping roll and having a curtain outlet at a side of the curtain frame through which the curtain fabric is drawn out;

a wrapping spring provided inside the wrapping roll to elastically bias the wrapping roll such that the curtain fabric is wound on the wrapping roll;

the curtain fabric wound on the wrapping roll and drawn out through the curtain outlet of the roller blind to block sunlight which comes in the door-side window of the car; and the draw-out bar formed at the end of the curtain fabric to allow the curtain fabric to be stretched to correspond to the window.

3. The device of claim 1, wherein the curtain holding device further includes:

a spring wound on the stop rod to elastically bias the holding roller toward a holding state position.

4. The device of claim 3, wherein the wire penetrates the support frame in a longitudinal direction of the support frame, in which as the curtain knob pivots vertically, the holding operation of the holding roller is released by moving the holding roller in a longitudinal direction of the stop rod by a pulling operation of the wire to draw out the curtain fabric.

5. The device of claim 1, wherein the support frame includes a plurality of telescoping rods configured to be drawn out to extend along the length of the curtain fabric.

* * * * *